March 20, 1934.　　F. CORDERO ET AL　　1,952,037
ALTIMETER
Filed Aug. 24, 1927　　2 Sheets-Sheet 1
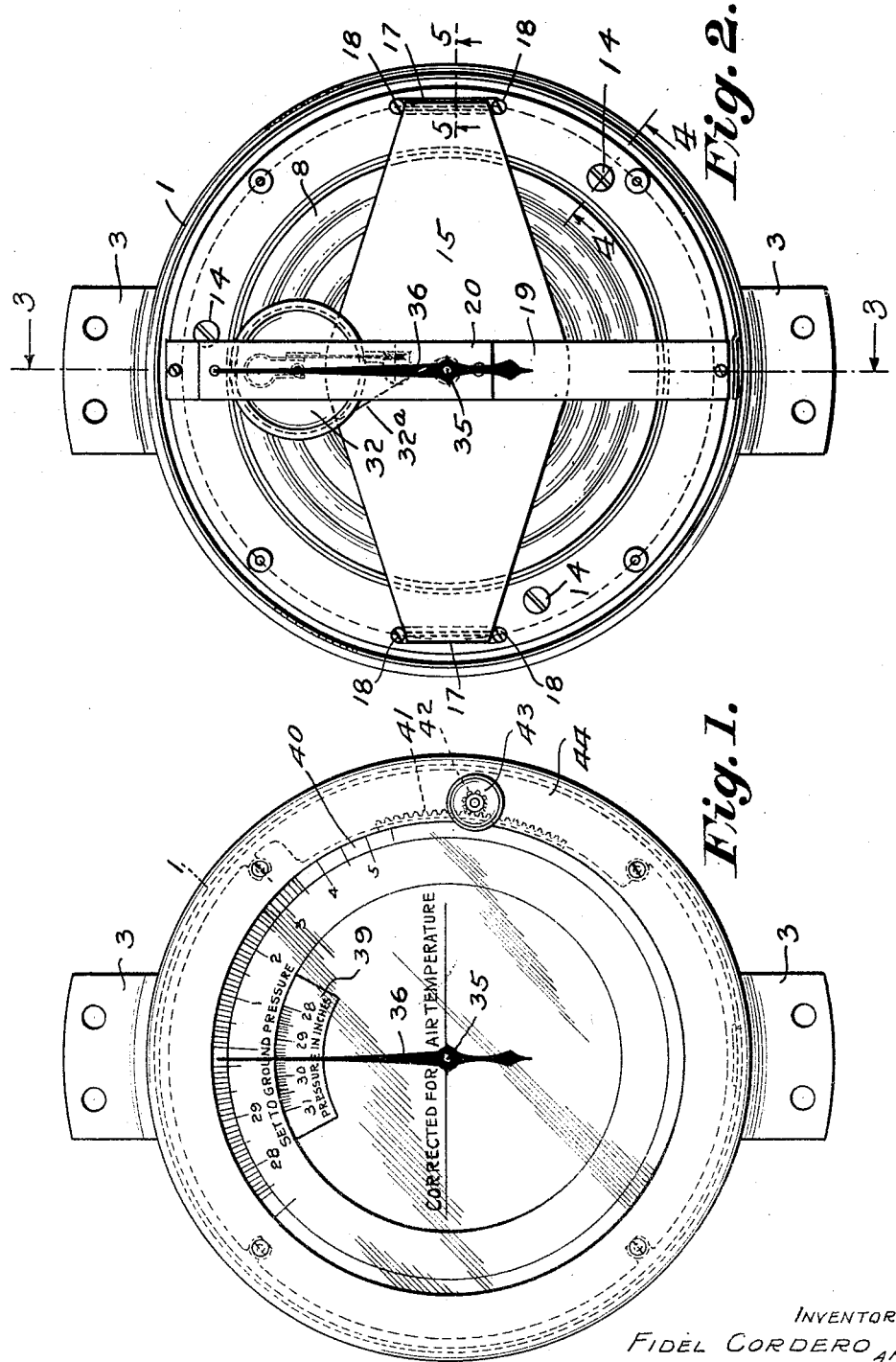
INVENTORS
FIDEL CORDERO AND
ATHERTON H. MEARS
BY Robert A. Lavender
ATTORNEY March 20, 1934.  F. CORDERO ET AL  1,952,037
ALTIMETER
Filed Aug. 24, 1927  2 Sheets-Sheet 2
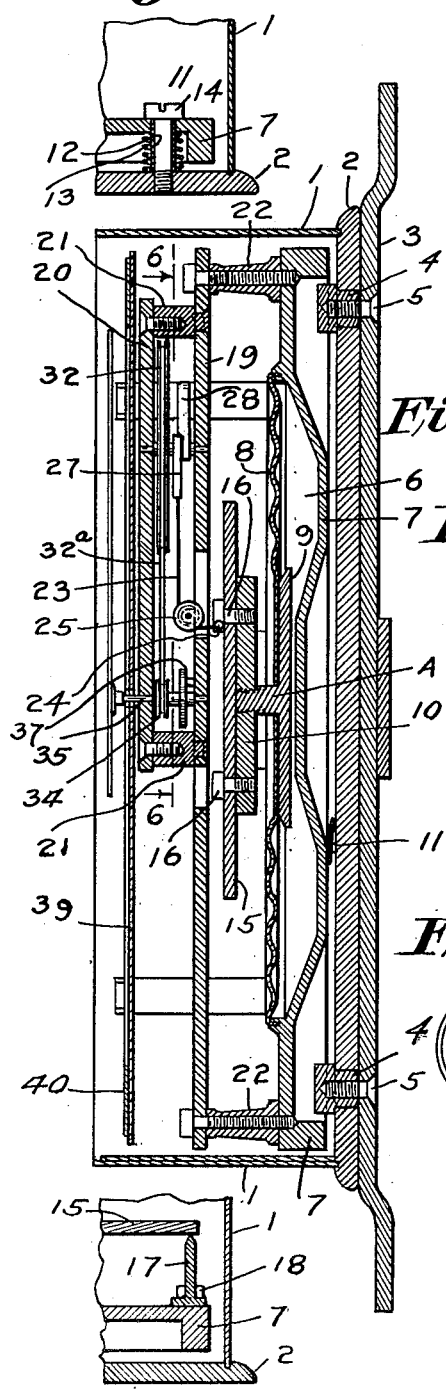
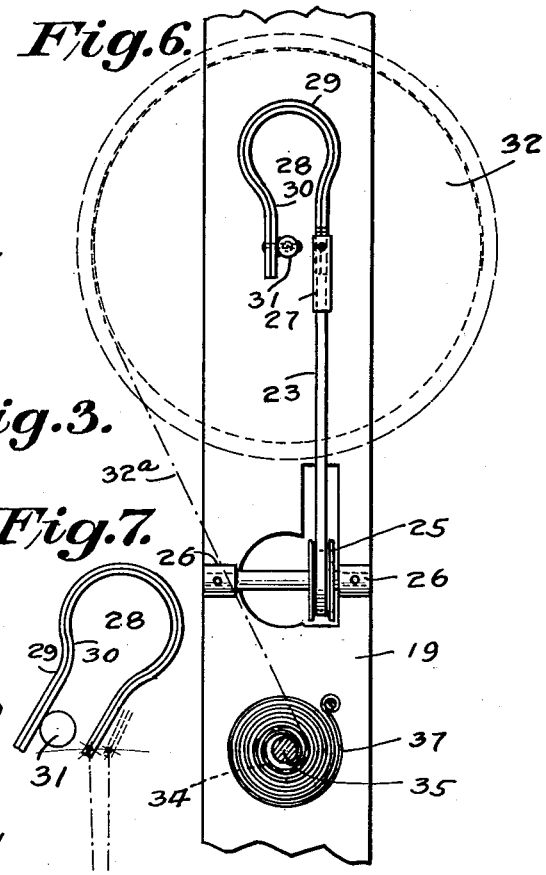
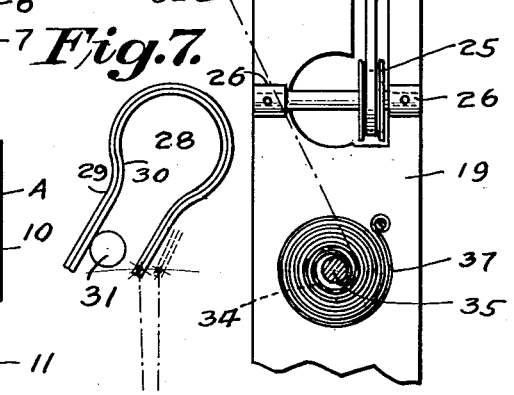
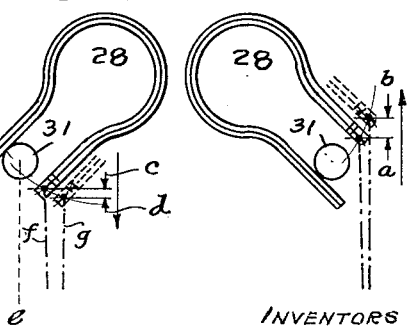
INVENTORS
FIDEL CORDERO AND
ATHERTON H. MEARS
BY Robert A. Lavender
ATTORNEY Patented Mar. 20, 1934

1,952,037

UNITED STATES PATENT OFFICE 1,952,037

ALTIMETER

Fidel Cordero, Takoma Park, Md., and Atherton
H. Mears, Philadelphia, Pa.

Application August 24, 1927, Serial No. 215,156

6 Claims. (Cl. 73—4)

(Granted under the act of March 3, 1883, as
amended April 30, 1928; 370 O. G. 757)

Our invention relates broadly to altimeters and more particularly to those altimeters having air temperature compensating means.

An object of our invention is to provide an altimeter in which the indicating mechanism for altitude is automatically adjusted by air temperature changes.

Another object of our invention is to provide an altimeter for indicating the altitude at a single reading, including compensation for air temperature changes.

With the above and other objects in view our invention consists in the construction, combination and arrangement of parts as will be hereinafter more fully described.

Reference is to be had to the accompanying drawings forming a part of this specification, in which like reference characters indicate corresponding parts throughout the several views, and in which Figure 1 is a face view of our invention, Figure 2 is a view with the dial removed showing the interior, Figure 3 is a sectional view on the line 3—3 of Fig. 2, with the dial in place, Figure 4 is a sectional view on the line 4—4 of Fig. 2, Figure 5 is a sectional view on the line 5—5 of Fig. 2, Figure 6 is an enlarged view of the temperature compensating mechanism, taken on the line 6—6 of Fig. 3, and Figures 7, 8, 9, and 10 show various positions of adjustment of the temperature element.

Referring more particularly to the drawings, 1 represents a casing mounted on a suitable base plate 2 supported on a bracket 3 that is secured to a structural member of an aircraft. Casing 1 is provided with ventilating openings to permit free circulation of air within the instrument. The base plate 2 is secured to the bracket 3 by screws 5 passing through bushing 4, and provides a support for a vacuum chamber 6 comprising a rigid back member 7 and diaphragm 8, forming a face plate. The diaphragm is corrugated except at its center portion, where a circular plate 9 is attached by a stud A that provides a support for connecting a cross member 10 to a spring plate 15.

The vacuum chamber 6, that carries the indicating mechanism and supports, is free to float on shock absorbing spring cushion members 11 at three or more points around its periphery. The members 11 are composed of screws 14 that operate freely through apertures in the flange of the back member 7, spacers 12, and spring 13, as may be more clearly seen in Figure 4.

Spring plate 15 is secured to the cross member 10 by screws 16 and at its ends rests on knife-edge bearing brackets 17 that are secured to the flange of the member 7 by fastening elements 18, as may be seen in Figures 2 and 5.

The plate 15, being constructed of a very resilient spring sheet, is utilized to damp the movement of the diaphragm 8 by transmitting the damping action by means of the connecting screws 16, which secure the diaphragm 8 through the circular disc 9 and stud A.

The mechanism for compensating for air temperature changes is supported in bearings in bridge plates 19 and 20 that are carried by member 7, and spaced therefrom by posts 22, the plate 20 being spaced from plate 19 by posts 21, in a manner to form a rigid mounting for an indicating mechanism.

A metallic ribbon 23 for conveying movement of the diaphragm 8 to the indicating mechanism is secured at 24 to one of the screws holding the cross member, passed over an idler pulley 25 mounted in bearings 26 on bridge plate 19, then changes its direction and is secured at its other end to a free leg 27 of a bi-metallic temperature compensating member 28. This member is constructed of an outer strip 29 of brass and an inner strip 30 of steel, or other suitable dissimilar metals, and is bent in the shape of a horseshoe with one leg secured to a rotatable shaft 31, and the other leg secured to the ribbon 23.

The shaft 31, to which the compensating member is secured, also has fixedly secured thereto a multiplying pulley 32, that causes the small movements of the vacuum diaphragm to be stepped up at the indicating dial. A second metallic ribbon 32a, secured to the periphery of pulley 32 and to a pulley 34 on a shaft 35, transmits magnified motion to a pointer 36 secured to the shaft. In order to prevent slack in the ribbons 23 and 32a we have provided a hair spring 37 between the shaft 35 and plate 19.

The face of the instrument is provided with a center fixed dial 39 with graduations at the top in pressure units, and is also provided with a movable outer dial manually adjustable for ground pressure and graduated in altitude units. This dial is set by a rack 41 that meshes with a pinion 42 operated by a knob 43 mounted on the outer rim 44 of the casing 1.

The operation of the device is as follows: when the atmospheric pressure changes, the vacuum diaphragm is deflected. This motion is multipled and transmitted to the pointer, and being proportional to the pressure change, is therefore made proportional to changes in altitude by a suitable arrangement of the multiplying mechanism. In the ordinary altimeter, if air temperature varies and the pressure remains constant, the thermal changes would cause changes to be registered on the indicating dial unless compensated for. In our instrument, a bi-metallic strip is used to compensate automatically for two definite effects of changes in temperature; one being a change of the reading of the instrument when the pressure remains constant, for example, at normal or other constant pressure, and the other being a change in the reading of the instrument due to the effect of variations in temperature when the pressure decreases or increases simultaneously with temperature variations.

Let it be assumed that the instrument is subjected to a change in temperature of, say, 30 degrees, and that during this change in temperature no pressure change has taken place. Ordinarily the reading of the instrument will vary due to the effect of this change in temperature. It is desirable, however, that this reading should be held constant, and this is automatically accomplished in our instrument by the adjustment of the angular setting of the bi-metallic strip on its shaft so that, as it is caused to vary in its shape by temperature changes it rotates the shaft on which the pointer is mounted, through a system of multiplying units. This motion takes place because the ribbon that connects the diaphragm and the bi-metallic strip is constant in length, and the ribbon connecting the pulley on the bi-metallic strip shaft and the pointer shaft is held taut by a hair spring. The pointer will, therefore, be caused to move in one direction when the angular setting of the bi-metallic strip is as shown in Fig. 9, and will be caused to move in the opposite direction when the setting is as shown in Fig. 10. Thus, no matter what direction of motion of the pointer a change in temperature would normally produce when a pressure has any selected constant value, the bi-metallic strip can be set on the shaft to compensate for it. As this motion is ordinarily small, only a small angular range of adjustment of the bi-metallic strip is required.

Compensation for the effect caused by change in free air temperature, as above referred to, is desirable as altimeters are pressure measuring instruments only and are calibrated to an altitude-pressure relation containing an altitude-temperature that does not generally correspond to actual upper air temperatures. As the bi-metallic strip used in our invention changes the multiplying ratio of the mechanism, the indications are modified to take account of changes in the free air temperature from that assumed in the altitude pressure relation to which the instrument is normally calibrated. It will be noted in Figs. 8, 9 and 10 that the lever arm of the bi-metallic strip changes position as the temperature changes, as from e—f to e—g in Fig. 9. In Fig. 8 is shown the position of the bi-metallic strip when the altitude reading decreases with decrease in temperature: in Fig. 9, the position of the strip when the altitude reading increases with decrease in temperature; and in Fig. 10, the position of the strip when the altitude reading decreases with decrease in temperature.

The above adjustment of the bi-metallic strip on its shaft, however, is determined and is only necessary on assembly of each instrument, and needs no further attention, as the bi-metallic member 28 will automatically take care of the varying adjustment according to temperature changes. The motion of the free leg 27 around its axis with relation to the direction of the metallic ribbon 23 will counteract any change in temperature at sea level pressure.

The member 28 is so arranged in the multiplying mechanism that a very small movement will correct the reading of the indicating pointer. The radius of motion of the leg 27 will decrease about its axis for a rise in temperature and will increase for a decrease in temperature.

The instrument indicates to a very close approximation the true altitude, and up to 30,000 feet has been found to be extremely accurate for aeronautical purposes.

The amount that the multiplying ratio must vary with temperature is determined in the following manner:

Altitudes above the earth's surface are determined by the formula:

$$H=62900\frac{Tm}{283}\log.\frac{Po}{P}$$

in which H=altitude in feet,
P=pressure of air at upper level in mm. of mercury, Po=pressure of air at low level, and Tm=mean temperature of air column at H altitude, in absolute scale in centigrade units.

It will be understood that the above description and accompanying drawings comprehend only the general and preferred embodiment of our invention and that various minor changes in details of construction, proportion and arrangement of parts may be resorted to within the scope of the appended claims and without sacrificing any of the advantages of our invention.

The invention herein described may be manufactured and used by or for the Government of the United States for governmental purposes without the payment to us of any royalty thereon or therefor.

What is claimed is:

1. In an altimeter, in combination, a casing provided with a vacuum chamber, cushioned supports for the chamber, a diaphragm forming one wall of the chamber, an indicating device, means connecting said diaphragm and said indicating device to control the latter upon movement of the former, an element responsive to temperature changes forming part of said connecting means to compensate for temperature changes, and a manually controlled means for correcting the said indicating device for ground pressure.

2. In an altimeter, in combination, a casing, a vacuum chamber supported on the casing, a diaphragm forming one wall of the chamber, bridge plates carried by the chamber, a shaft mounted in said bridge plates, a temperature responsive member attached to the shaft, means operatively connecting the diaphragm and said member, an indicator, and means operatively connecting the shaft and indicator.

3. In an altimeter, in combination, a vacuum chamber, a diaphragm forming one wall of said chamber, spaced bridge plates supported by said chamber, indicating mechanism including a fixed dial, an adjustable dial and a pointer, a temperature compensating member supported by said bridge plates and adapted to vary the movements of said indicating mechanism, a flexible connection between said temperature compensating member and said diaphragm for transmitting variable motion through said compensating member to said pointer, motion multiplying means located between said compensating member and said pointer for moving said pointer, and manually controlled means for correcting the setting of the indicating mechanism.

4. In an altimeter, in combination, a housing, a vacuum chamber, a diaphragm forming one wall of said chamber, spaced bridge plates supported by said chamber, shafts having bearings in said bridge plates, an adjustable indicator dial, a fixed dial, a pointer attached to one of said shafts and adapted to move upon said dials, a spring plate supported by said diaphragm for damping the movement of the diaphragm, a temperature responsive member having one leg attached to one of said shafts, a flexible link connecting a free leg of said temperature responsive member to said spring plate of said diaphragm, a motion multiplying pulley connected to the one of said shafts supporting said temperature responsive member, a second flexible connection between said motion multiplying pulley and the other of said shafts having said pointer attached thereto, a slack absorbing spring attached to one of said shafts and having its other end secure to one of said bridge plates, said slack absorber spring adapted to return said pointer to zero position relative to said fixed dial, and means for setting said adjustable dial to compensate for variations of ground pressure.

5. In an altimeter, in combination, a casing, an adjustable indicator dial, a pointer, a vacuum chamber supported within said casing, a diaphragm forming one wall of said chamber, a plurality of bridge plates carried by said chamber, shafts having bearings in said bridge plates, one of said shafts having said pointer attached thereto, a temperature responsive member having one leg attached to one of said shafts, a flexible link connecting a free leg of said temperature responsive member to said diaphragm, a motion multiplying pulley connected to one of said shafts, a second flexible connection between said pulley and the other of said shafts, a slack absorbing spring attached to one of said shafts and having its other end secured to a stationary part for returning said pointer to zero position, and means for adjusting said indicator dial to compensate for variation of ground pressure.

6. In an altimeter, in combination, a casing, a fixed dial graduated for reading in ground pressure units, a movable dial graduated in altitude units, a pointer mounted to register on said dials, manually operated means for correcting the relative positions of said dials, a vacuum chamber supported within said casing, a diaphragm forming one wall of said chamber, bridge plates carried by the chamber, shafts mounted in said bridge plates, one of said shafts carrying said pointer, a temperature responsive member attached to another of said shafts, a flexible link connecting said diaphragm and said temperature responsive member, a motion multiplying pulley mounted on the shaft to which the temperature responsive member is attached, a second flexible connection between said pulley and to the shaft carrying the pointer, a slack take-up member connected to said shaft supporting said pointer for returning said pointer to zero position.

FIDEL CORDERO.
ATHERTON H. MEARS.